(12) United States Patent
Joshi et al.

(10) Patent No.: US 9,411,921 B2
(45) Date of Patent: *Aug. 9, 2016

(54) FET-BOUNDING FOR FAST TCAD-BASED VARIATION MODELING

(75) Inventors: Rajiv V. Joshi, Yorktown Heights, NY (US); Rouwaida N. Kanj, Round Rock, TX (US); Keunwoo Kim, Somers, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 461 days.

This patent is subject to a terminal disclaimer.

(21) Appl. No.: 13/457,722

(22) Filed: Apr. 27, 2012

(65) Prior Publication Data
US 2013/0289965 A1    Oct. 31, 2013

(51) Int. Cl.
*G06F 17/50*    (2006.01)

(52) U.S. Cl.
CPC ........ *G06F 17/5068* (2013.01); *G06F 2217/10* (2013.01)

(58) Field of Classification Search
CPC ............ G06F 17/5022; G06F 17/5036; G06F 17/5045; G06F 11/261; G06F 17/5009; G06F 17/5018; G01R 31/318357
See application file for complete search history.

(56) References Cited

U.S. PATENT DOCUMENTS

| | | | |
|---|---|---|---|
| 6,173,240 B1 | 1/2001 | Sepulveda et al. | |
| 7,448,012 B1 * | 11/2008 | Qian | 716/122 |
| 7,659,579 B2 | 2/2010 | Anderson et al. | |
| 8,090,464 B2 | 1/2012 | Bomholt et al. | |
| 8,176,445 B1 | 5/2012 | Qian | |
| 2002/0123872 A1 * | 9/2002 | Okada | G06F 17/5018 703/15 |
| 2009/0031268 A1 | 1/2009 | Miranda et al. | |
| 2009/0044158 A1 | 2/2009 | Lilja | |
| 2010/0114553 A1 * | 5/2010 | Kim et al. | 703/14 |
| 2011/0144968 A1 | 6/2011 | Naruta | |
| 2011/0178778 A1 * | 7/2011 | Tsai et al. | 703/1 |
| 2011/0282478 A1 * | 11/2011 | Shen et al. | 700/104 |
| 2011/0313747 A1 | 12/2011 | Joshi et al. | |
| 2012/0203532 A1 | 8/2012 | Olsen et al. | |

OTHER PUBLICATIONS

Wikipedia, "Thevenin's theorem," page revision as of Apr. 25, 2011, 3 pages.*
Kim, S., et al. "TCAD-Based Statistical Analysis and Modeling of Gate Line-Edge Roughness Effect on Nanoscale MOS Transistor Performance and Scaling" IEEE Transactions on Semiconductor Manufacturing, vol. 17, No. 2. May 2004. pp. 192-200.
Mar, J. "The Application of TCAD in Industry" Proc. of SISPAD—International Conference on Simulation Semiconductor Process and Devices. Sep. 1996. pp. 139-145.

(Continued)

*Primary Examiner* — Saif Alhija
(74) *Attorney, Agent, or Firm* — Yuanmin Cai; Hoffman Warnick LLC (57) ABSTRACT

A method for analyzing circuits includes identifying one or more device zones in a full device structure. The device zones provide areas of interest to be analyzed. A partial device is generated that representatively includes the one or more device zones. Analytical meshes of the partial device are reduced by employing physical characteristics of the full device structure. The partial device is simulated, using a processor, to obtain device output information in the areas of interest that is representative of the full device structure. Systems are also disclosed.

14 Claims, 8 Drawing Sheets

(56) References Cited

OTHER PUBLICATIONS

Rofougaran, A., et al. "A Table Lookup FET Model for Accurate Analog Circuit Simulation" IEEE Transactions on Computer-Aided Design of Integrated Circuits and Systems, vol. 12, No. 2. Feb. 1993. pp. 324-335.

Synopsys, Inc. "Taurus Medici—A 2D Device Simulator" Printed: Apr. 2012. Copyrighted 2012. (2 Pages) http://www.synopsys.com/tools/tcad/devicesimulation/pages/taurusmedici.aspx.

Zhou, X. "Multi-Level TCAD Synthesis Approach to the Design and Optimization of Ultra-Small Transistors" Visiting Researcher Seminar. School of Electrical and Electronic Engineering—Nanyang Technological University. Nov. 1997. pp. 1-12.

Office Action dated Apr. 24, 2013 for U.S. Appl. No. 13/611,359.

Shigyo et al., "Technology CAD Based Statistical Simulation of MOSFETs", Solid State Electronics 44 (2000), pp. 1001-1007.

Amith Singhee, "Statistical Blockade: Very Fast Statistical Simulation and Modeling of Rare Circuit Events and its Application to Memory Design", IEEE Transactions on Computer-Aided Design of Integrated Circuits and Systems, vol. 28, No. 8, Aug. 2009, pp. 1176-1189.

\* cited by examiner

FET-BOUNDING FOR FAST TCAD-BASED VARIATION MODELING

BACKGROUND

1. Technical Field

The present invention relates to computer aided design, and more particularly to systems and methods for fast and accurate integrated circuit design tools.

2. Description of the Related Art

Fast and accurate circuit simulations and analysis are required to capture rapidly-changing device features, intrinsic device fluctuation, and random mismatch among adjacent devices in integrated circuits. Numerical device simulations (i.e., technology computer aided design (TCAD) based on drift-diffusion or hydrodynamic transport with partial differential equations are physically accurate tools. However, simulation run-time is significantly extended due to complex computations and computational overhead. Furthermore, to achieve and understand "statistical" distributions is very challenging in TCAD-aided analysis and for design for manufacturability (DfM) applications.

For circuit functionality at the macroscopic level, conventional statistical methods are typically based on threshold voltage (Vt), channel length (L), and channel width (W) distributions. These parameters include the use of standard deviations for Vt, L, and W. Thus, the application of conventional statistical methods is limited to critical circuits such as SRAM and eDRAM circuits (e.g., in mixed-mode simulations). However, a domain not adequately addressed thus far is the device or process functionality at the microscopic level. Statistical analyses should address device or process functionality and yield using different-level parameters beyond the macroscopic level of conventional circuit analysis tools.

SUMMARY

A method for analyzing circuits includes identifying one or more device zones in a full device structure. The device zones provide areas of interest to be analyzed. A partial device is generated that representatively includes the one or more device zones. Analytical meshes of the partial device are reduced by employing physical characteristics of the full device structure. The partial device is simulated, using a processor, to obtain device output information in the areas of interest that is representative of the full device structure.

A system for technology computer aided design includes a processor, memory coupled to the processor; and a program module stored in the memory and configured to analyze circuit designs. The program module includes a partial device module configured to identify one or more device zones in a full device structure. The device zones provide areas of interests to be analyzed. The partial device module generates at least one partial device that representatively includes the one or more device zones. The program module is configured to simulate the partial device to obtain device output information in the areas of interest that is representative of the full device structure to reduce computational overhead.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, systems and methods are provided to quickly and accurately represent integrated circuit devices for circuit simulation and modeling applications. In particularly useful embodiments, physically accurate and fast statistical technology computer aided design (TCAD) methods are provided. These methods significantly speed up TCAD simulator engines, and hence statistical runs of the simulation. Systems in accordance with the present principles employ a new partial device analysis, which is fast, efficient and is targeted towards a larger number of applications and uses than conventional TCAD applications.

In some embodiments, application-specific methods are provided which employ microscopic level analyses of sub-circuit level phenomena. The present methods can focus on pin-pointed regions and describe phenomena in those regions accurately by employing device zones and partial devices. In one embodiment, a specific device structure is created with meshes and profiles. Meshes refer to analytical meshes employed to divide up geometry into finite elements commonly employed in many analysis tools. The profiles refer to diffusion profiles of integrated circuit devices, such as source and drain regions, body or channel regions or the like. Specific implies focused on a specific device zone. The device zone selected is or will be of particular interest in the design. Device zones may include component interfaces, junctions, high stress regions and the like. Device zones may encompass a portion of the design that affects the device yield.

The present principles define a partial device based upon one or more device zones. The partial device enables a reduction in the meshes and profiles. The creation of the specific device structure permits or enables partial device analysis leading to fast TCAD simulations. A fast-statistical computation using a reduced number of device meshes is performed to estimate probability of certain electrical aspects of the devices.

Another aspect of the present principles includes employing new TCAD methods for device parameters (such as, e.g., R-bounding, C-bounding, and Q-bounding, which will be described in greater detail herein). These device parameters can be directly used in in design for manufacturability (DfM) efforts, device/process design, and table look-up techniques (TLU). Analytical computations may include embedded fast numerical TCAD-based Monte Carlo simulation in specific areas of the device or design. It should be understood that the simulations described herein may be performed for any type of circuit (e.g., digital or analog), for any type of electrical, optical or electronic component (e.g., transistors, diodes, capacitors, etc.).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
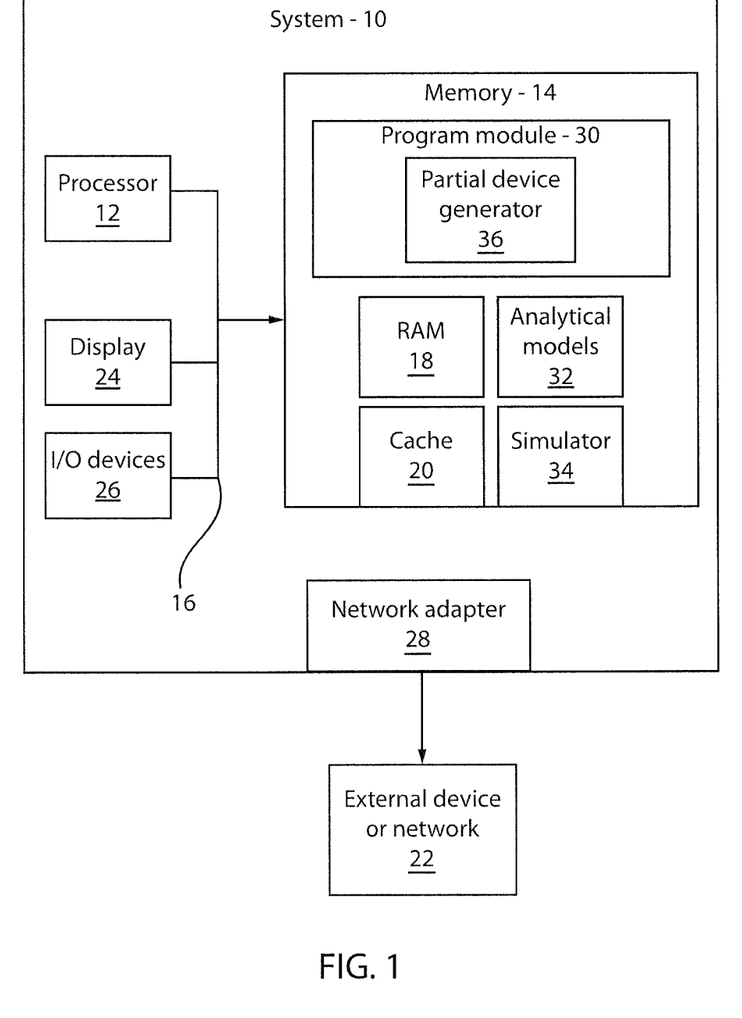
FIG. 1 is a block/flow diagram showing a system/method for technology computer aided design (TCAD) in accordance with the present principles.

Referring now to the drawings in which like numerals represent the same or similar elements and initially to FIG. 1, a system 10 for executing computer aided applications and simulations (e.g., TCAD) is shown in accordance with one illustrative embodiment. System 10 is shown in a basic form and may be included in a larger system or network, may be employed in a cloud computing node, may be employed as a server, etc. These examples are illustrative of suitable applications and are not intended to suggest any limitation as to the scope of use or functionality of embodiments described herein. Regardless, system 10 is capable of being implemented and/or performing any of the functions set forth herein.

System 10 may be operational with numerous other general purpose or special purpose computing system environments or configurations. Examples of well-known computing systems, environments, and/or configurations that may be suitable for use with system 10 include, but are not limited to, personal computer systems, server computer systems, thin clients, thick clients, hand-held or laptop devices, microprocessor-based systems, set top boxes, programmable consumer electronics, network PCs, minicomputer systems, mainframe computer systems, and distributed cloud computing environments that include any of the above systems or devices, and the like.

System 10 may be described in the general context of computer system-executable instructions, such as program modules, being executed by a computer system. Generally, program modules may include routines, programs, objects, components, logic, data structures, and so on that perform particular tasks or implement particular abstract data types. System 10 may be practiced in distributed cloud computing or other network environments where tasks are performed by remote processing devices that are linked through a communications network. In a distributed cloud computing environment or network, program modules may be located in both local and remote computer system storage media including memory storage devices.

System 10 is shown in the form of a general-purpose computing device. The components of computer system 10 may include, but are not limited to, one or more processors or processing units 12, a system memory 14 and a bus 16 that couples various system components including system memory 14 and processing units 12.

Bus 16 represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus, etc.

Computer system 10 may include a variety of computer system readable media. Such media may be any available media that is accessible by computer system 10, and it includes both volatile and non-volatile media, removable and non-removable media.

System memory 14 may include computer system readable media in the form of volatile memory, such as random access memory (RAM) 18 and/or cache memory 20. Computer system 10 may further include other removable/non-removable, volatile/non-volatile computer system storage media. By way of example only, system memory 14 can be provided for reading from and writing to a non-removable, non-volatile magnetic media (e.g., a hard drive). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 16 by one or more data media interfaces. As will be further depicted and described below, memory 14 may include at least one program product having a set (e.g., at least one) of program modules that are configured to carry out the functions of embodiments in accordance with the present principles.

A program or program module 30 may be stored in memory 14. The program module 30 may include, for example, an operating system, one or more application programs, other program modules and program data. Program module 30 may include an integrated circuit analysis tool, such as, a TCAD application or may include an add-on module for TCAD applications. Program module 30 carries out the functions and/or methodologies of the present embodiments as described herein.

Computer system 10 may also communicate with one or more input/output devices 26 such as a keyboard, a pointing device, a display 24, etc.; one or more devices that enable a user to interact with computer system 10; and/or any devices (e.g., network adapter or card 28, modem, etc.) that enable computer system 10 to communicate with one or more other computing devices. Computer system 10 can communicate with one or more external devices or networks 22 such as a local area network (LAN), a wide area network (WAN), and/or a public network (e.g., the Internet) via the network adapter 28. Network adapter 28 communicates with the other components of computer system via bus 16. It should be understood that although not shown, other hardware and/or software modules could be employed in conjunction with computer system 10. Examples, include, but are not limited to: microcode, device drivers, redundant processing units, external disk drive arrays, RAID systems, tape drives, and data archival storage systems, etc.

Program module 30 is configured to develop analytical models 32 for application-specific areas that can be used in statistical methods. Analytical models 32 are developed and stored for execution in modeling or simulating new or old designs. The analytical models 32 in accordance with the present principles can assist in speeding up a simulator engine 34 and reduce computational overhead by reducing statistical runs. The simulator engine 34 is adapted to execute an analysis on the analytical models 32 in accordance with user instructions, with the use of the processor 12 and in accordance with CAD programs. The program module 30 may include a TCAD application. The analytical models 32 may be built with Application-Specific TCAD statistical tools or methods using fast importance sampling (fast statistical) techniques. This includes the development and use of partial device analysis in accordance with the present principles.

The program module 30 includes a partial device module 36 configured to identify one or more device zones in a full device structure. The device zones provide areas of interests to be analyzed. For the set of device zones, the partial device module 36 generates at least one partial device that representatively includes the one or more device zones. Once the partial device is determined, the partial device module 36 may be employed to reduce meshes and profiles that would normally be defined by conventional systems. These processes may include user guidance of the computer system 10 through appropriate interfaces 26.

Figure 2:
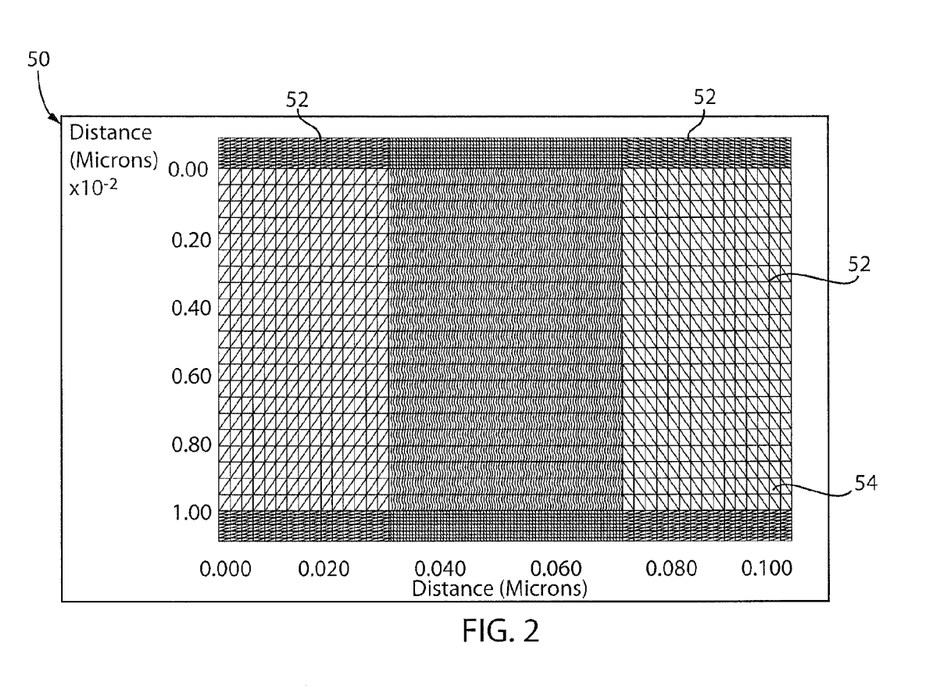
FIG. 2 is device structure having a full mesh generated thereon for analysis of the device structure.

Application-specific methods in accordance with the present principles include generating one or more "specific" device structures with meshes and profiles. Referring to FIG. 2, a device structure 50 is provided as an analytical model 32. The device structure 50 is illustratively depicted with meshes 52 generated for an entire device. Different mesh elements 54 are employed and may depend on geometry, diffusion profiles, importance of a region, user selected criteria, etc. Meshes and profiles include finite element meshes 52 employed for analyzing integrated circuit device structures and determining physical characteristics of the structures. The physical characteristics may include, e.g., voltages, currents, diffusion profiles, stress profiles, strain profiles, temperature profiles, etc.

Figure 3:
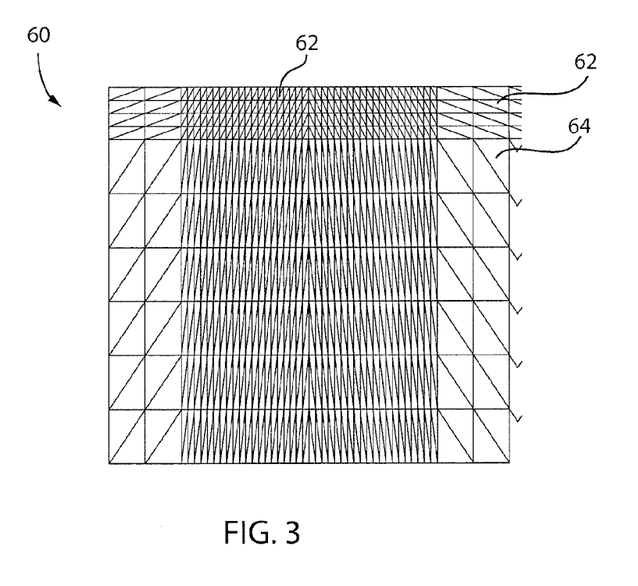
FIG. 3 is a partial device, in accordance with one embodiment, having a reduced mesh generated thereon for analysis of the device structure of FIG. 2.

The specific portions of the device structure 50 may be defined as device zones. The device zone embodies important or interesting characteristics employed to represent characteristics of the device. The device zone or zones include less than the whole device. The device zones permit the generation of a partial device 60 illustrated in FIG. 3 for this example. The partial device 60 (which also becomes an analytical model 32) includes all of the device zones within its meshes 62 and finite elements 64 needed to represent the entire device structure 50 without the high density meshes and nodes of the device structure 50. Using the partial device 60, meshes, profiles, simulations and computations are truncated. This leads to fast TCAD simulations with minimal loss in accuracy. In one embodiment where transistors are employed, the use of a partial device may be referred to as field effect transistor (FET) bounding since the problem is bounded or limited based upon device zones.

Figure 4:
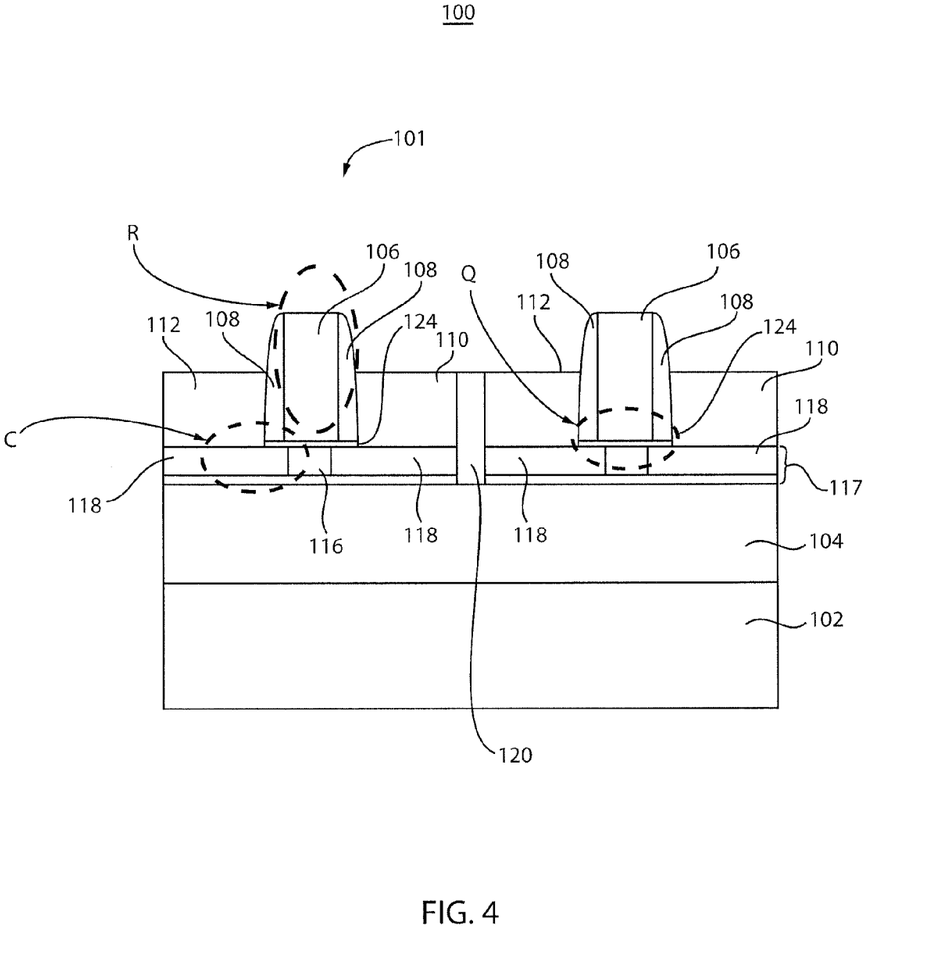
FIG. 4 is cross-sectional view of a CMOS device showing device zones identified in accordance with one illustrative embodiment.

Referring to FIG. 4, a portion 100 of an integrated circuit is shown in accordance with one illustrative embodiment. The portion 100 in this example includes complementary metal oxide semiconductor (CMOS) devices 101 and 103. The devices 101 and 103 are formed on silicon-on-insulator (SOI) structures having a substrate 102 (e.g., silicon), a buried oxide (BOX) layer 104 and a semiconductor region 117. The semiconductor region 117 includes extension regions 118 and a channel region 116. Source regions 112 and drain regions 110 are formed on the extension regions 118. A gate structure includes a gate conductor 106, sidewall spacers 108 and a gate dielectric 124. The devices 101 and 103 are isolated by a shallow trench isolation region 120.

In this case, device zones are identified as C, R and Q. In this example, R represents gate resistance probabilities using sigma R or R-bounding (e.g., limiting or bounding the resistance values to statistical distribution). In this example, C represents fast-statistical source and drain side capacitance computations using "distributive" junction models and overlap characteristics (sigma C or C-bounding).

In this example, $Q_g$ or Q represents an effective thickness for gate-insulator using sigma $t_{ox}$ ($t_{inv}$ may also be employed, which is an effective thickness when carrier charge of the gate is inverted) (or $Q_g$-bounding). These characteristics are of interest in designing field effect transistors that will be the focus of the present example. Other design zones and characteristic quantities may be defined as well in addition to or instead of the examples provided here. C, R and Q zones are employed to generate a partial device by truncating part of the meshes generated for a device structure generated by conventional analysis tools. The convention tools generate a full device structure with meshes (e.g., device structure 50, FIG. 2) and doping profiles, simulated current-voltage curves (IV curves) for every device in the circuit, extract sigma Vt, L, and W and perform a device/circuit mixed-mode (statistical) simulation using an extracted Vt distribution.

In accordance with the present principles, a partial device or devices are generated based upon common physical and dynamic boundaries. A common boundary is application-specific and may be defined by physical properties such as potential and electric field. Equi-potential/field parts may be truncated by maintaining physics or truth. Dynamic boundaries are varied on top of the common boundary and may be environment-specific, e.g., VDD, Vcs, temperature, etc. In addition to boundaries, other physical characteristics and historic data may be employed to truncate the device structure 50. Within a new boundary, the meshes can be adjusted based on a desired aggressiveness for the computation. For example, a number of nodes in a mesh may be reduced, nodes may be combined, etc. The nodes of the meshes include the end points of the finite elements. Immediate and efficient TCAD-simulation may be performed to predict application-specific results, e.g., for R, C, Q. It should be understood that the device zone concept can be applied to any phenomena hence the present principles can be performed using TCAD statistical analysis in a broad range of applications at the sub-device level.

Figure 5:
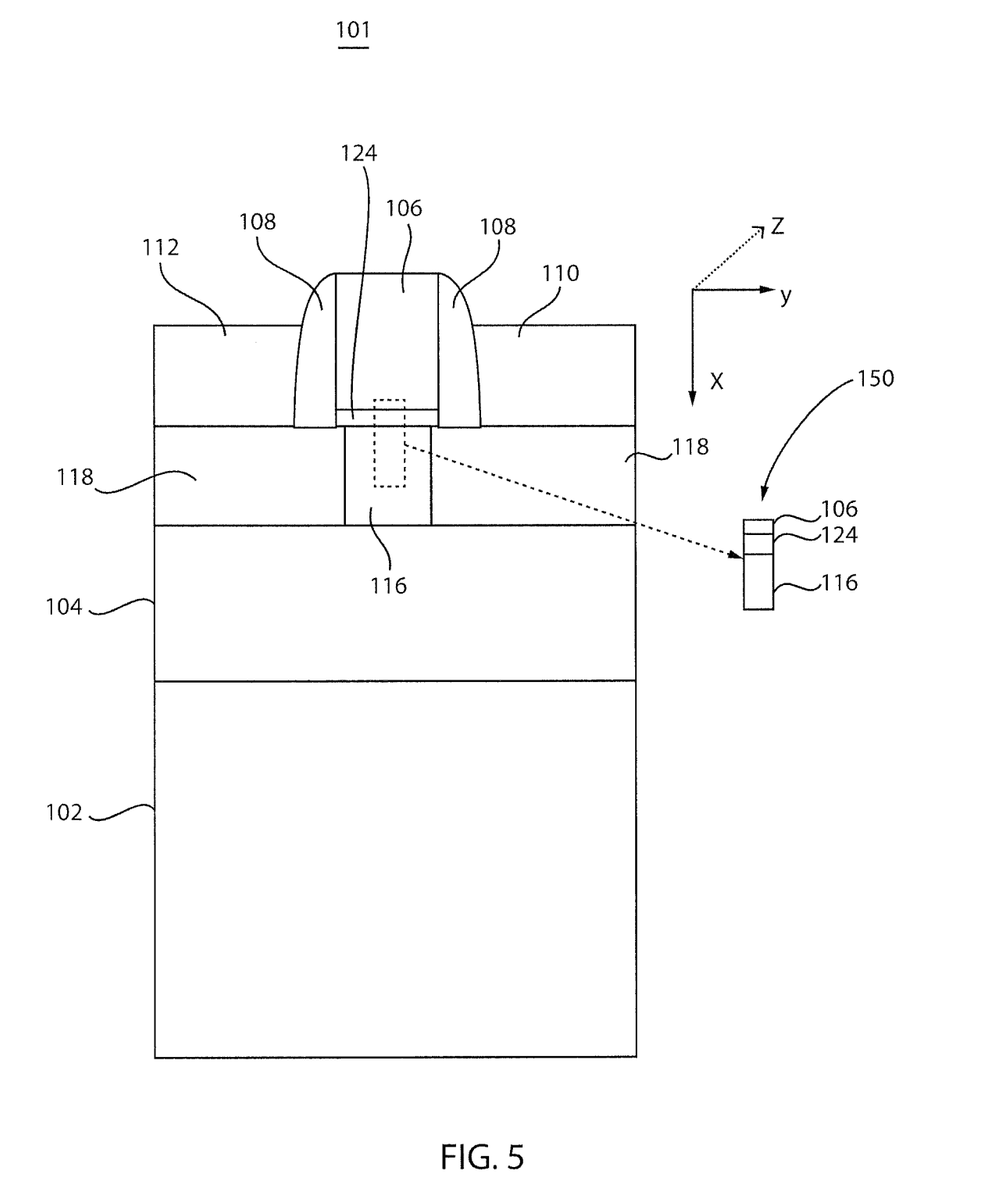
FIG. 5 is cross-sectional view of a field effect transistor showing a partial device being generated in accordance with one illustrative embodiment.

Referring to FIG. 5, device 101 is shown to illustrate the generation of a partial device 150. The partial device 150 is generated based on an analysis that reduces common physical and dynamic boundaries. Since R, C and Q are being investigated, the following reductions in the computation can be performed. In the gate 106, a gate sheet approximation may be employed. For the gate dielectric 124, the y and the z direction can be truncated to provide a characteristic thickness in the x direction that will yield the desired results. In the transistor body or channel 116, effective x, y and most of z can be reduced. The BOX layer 104 and the substrate 102 can be completely removed. By reducing the physical boundaries and employing common characteristics, the meshes and profile regions are also reduced. This reduces the overall TCAD computation. The partial device 150 is accurately representative of the entire device 101.

In one embodiment, the partial device 150 may be stored as a primitive (e.g., analytical model 32 in FIG. 1) and employed in other designs. When simulating a chip or large design, the partial device primitive may be employed for analysis instead of a whole device structure thereby significantly reducing computations. The primitives of partial device may be modified on a case by case basis depending on a particular design.

Figure 6:
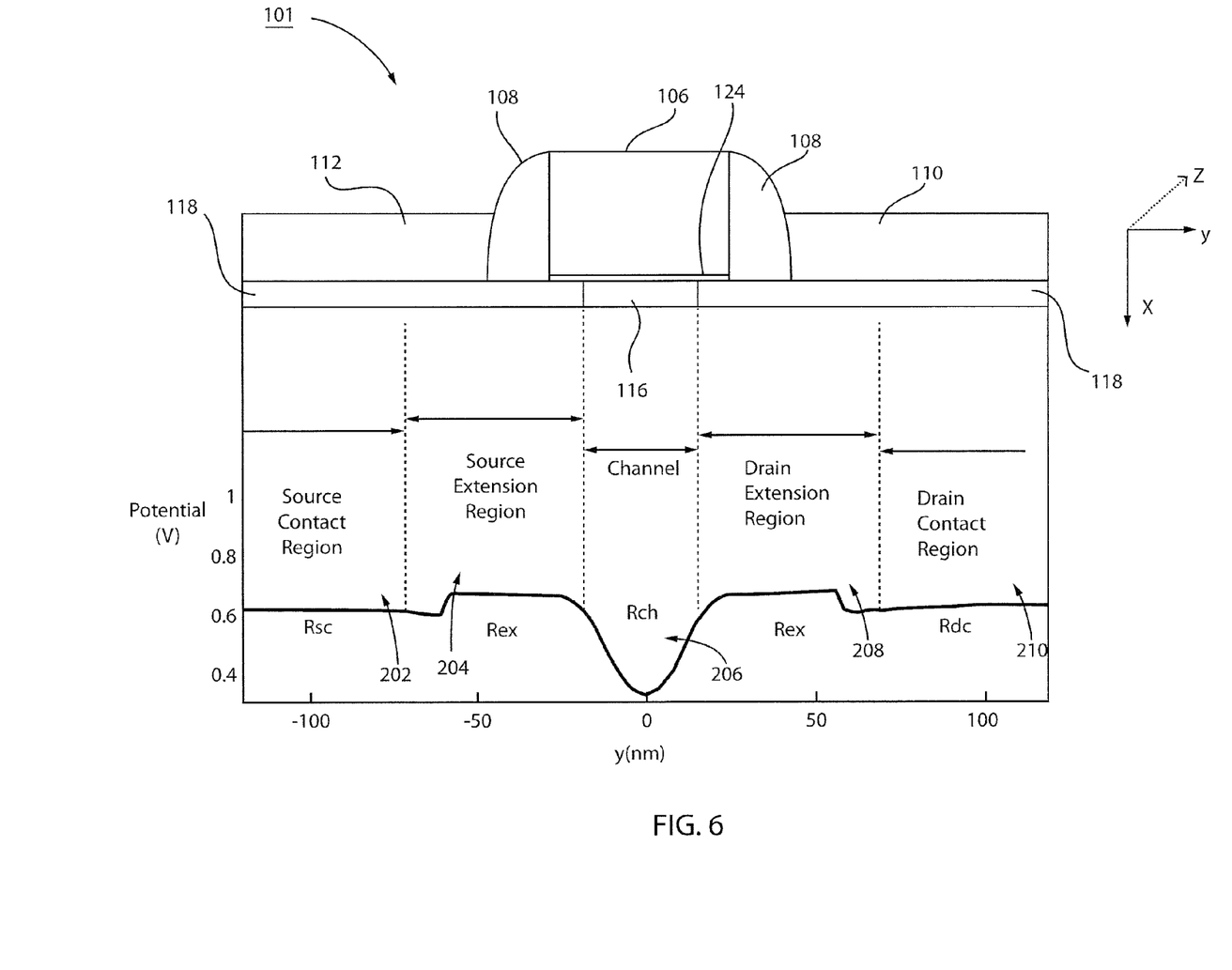
FIG. 6 is cross-sectional view of a field effect transistor showing common boundaries being employed to reduce analytical meshes in accordance with one illustrative embodiment.

Referring to FIG. 6, an additional example is depicted showing the utilization of common boundaries. Device 101 is depicted with each corresponding regions' potential (V) verses y coordinate. Source contact region 202 (resistance Rsc) and source extension region 204 (resistance Rex) are symmetrical (equal potential) with drain contact region 210 (resistance Rdc) and drain extension region 208 (resistance Rex). The potential drop between source and drain contact regions 202 and 210 and the source and drain extension regions 204 and 208 is small. These regions can be reduced or eliminated from the partial device 150. A channel region 206 (resistance Rch) shows the highest change in potential and is selected for the partial device 150. Using these and other physical properties, the partial device 150 may be confirmed or further truncated.

Figure 7:
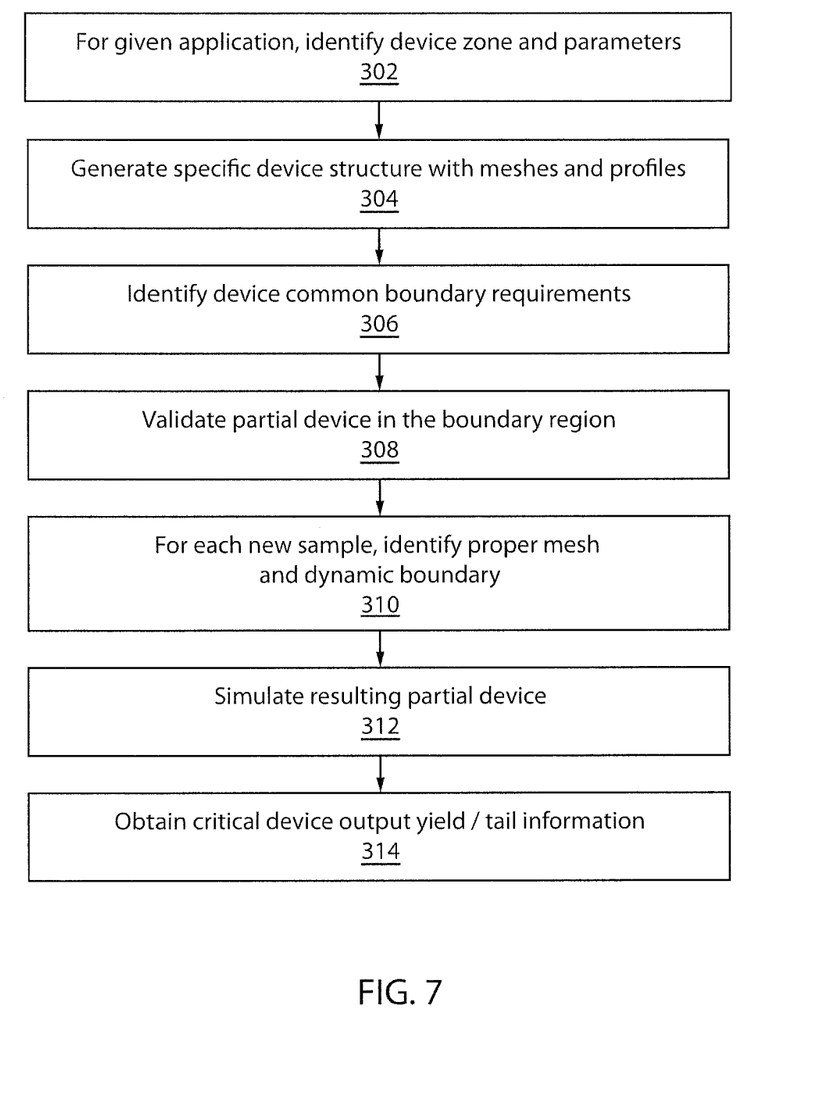
FIG. 7 is a block/flow diagram showing a method for analyzing circuits in accordance with one illustrative embodiment.

Referring to FIG. 7, a block/flow diagram shows an illustrative method which may be implemented by the program module 30 of system 10. In block 302, for a given application, device zones and parameters are identified. The device zones create bounding regions to reduce the computational problem (e.g., C, R and Q bounding regions). In block 304, specific device structures are generated with analytical meshes and profiles corresponding to the device zones. Conventional systems run a mesh around the entire circuit. In accordance with the present principles, the specific devices are singled out to attempt to reduce computations and increase speed. The specific device structures may include partial devices that embody all of the device zones regarded as pertinent to an analysis of the design at hand. In block 306, common device boundary requirements are identified. Common boundaries are application specific and defined by physical properties, e.g., potential and electric field. The identification of the device boundaries may permit the elimination of mesh nodes and the overall simplification of the problem. For example, parts of a device having equal potential may be truncated. Boundaries that change dynamically can start with common boundary properties with the dynamic component added to the common boundary directly on the partial device. Dynamic boundaries may include environmental changes such as changes to supply voltages, temperature, etc.

In block 308, in accordance with the device zones, the meshes, profiles and the common boundaries of the partial devices are validated in the bounding region or regions. This may include testing the partial device and comparing the results to those expected for the whole device or other standards or references. The validated partial device may be stored in a library for future use with this or other designs. In block 310, for each new partial device or design, the meshes and dynamic boundaries are further adjusted for the representative partial device. This adjustment also determines the aggressiveness of the computation. Aggressiveness in this case refers to a lowest number of meshes/nodes that can still yield useful results. The fewer meshes/nodes that simpler the computation. The meshes previously set up can be further reduced based on symmetry, physical properties that are equal and any other device specific or application specific properties.

In block 312, the partial devices may be simulated to analyze the design. In one embodiment, a fast-statistical calculation may be performed on the partial device using statistical device mesh characteristics to estimate probabilities of certain electrical aspects of the partial device. The estimated probability for the partial device accurately reflects the device as a whole or may be easily scaled to the device as a whole.

In block 314, critical device output such as yield or tail information is obtained. For device designers to achieve the best device characteristics, low failure probabilities are important. Designers are interested in the tail characteristics of the device, e.g., effective oxide thickness ($t_{ox}$), drain source resistance ($R_{ds}$), current leakage ($I_{leak}$), etc. A thorough understanding and qualification of tail region values (e.g., "corners") and their probabilities rely on the ability to estimate low failure probabilities. The present embodiments may employ Monte Carlo simulation to obtain the mean and standard deviation for various parameters. For tail probabilities, it is often needed to qualify the tail probability distributions (non-Gaussian tails, fat tails, etc.). By employing the partial device methodology, the device design can be better understood by limiting the analysis to probable characteristics. Such characteristics eventually impact the circuit design and its yield, and may be analyzed to improve the device designs. As described, the present principles provide device simulation (as opposed to mixed mode simulations) for all parameters of a device instead of just threshold voltage, Vt. The present principles provide the ability to perform immediate small structure (sub-device level) analysis in device simulations to predict specific statistical results (e.g., R, C, Q). The present principles are more adaptable for statistical analysis and in particular statistical analysis with a plurality of parameters (e.g., R, C, Q, etc.).

Figure 8:
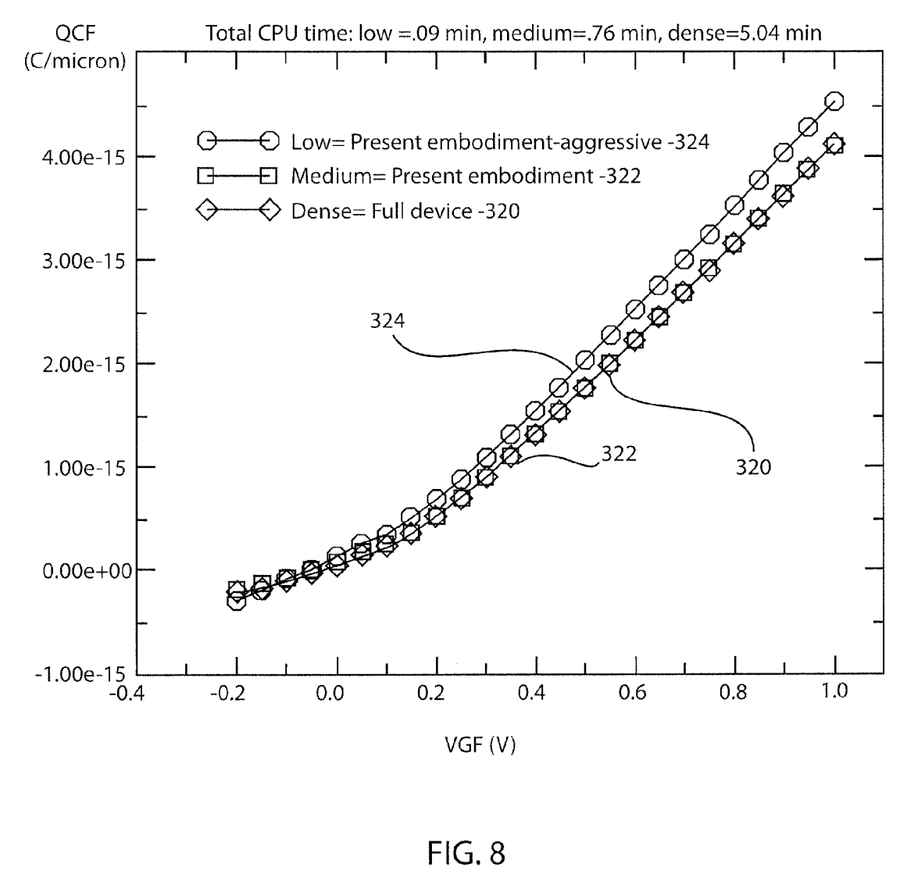
FIG. 8 is a graph illustratively comparing a conventional TCAD method with a TCAD method in accordance with the present principles and an aggressive TCAD method in accordance with the present principles.

Referring to FIG. 8, a graph illustratively depicts TCAD predicted results for gate charge (QGF) in Coulombs/micron (C/μm) versus gate voltage (VGF) in volts (V). A first plot 320 plots values for a conventional TCAD system, which considers a full device with a full mesh or meshes (dense mesh with fixed boundaries). A second plot 322 provides an analysis in accordance with the present principles. The second plot 322 shows data gathered using partial devices. A third plot 324 also provides an analysis in accordance with the present principles. The third plot 324 shows data gathered using partial devices as well, but the meshes were adjusted to provide an aggressive analysis. Here, aggressive means that the number of meshes was significantly reduced or adjusted below that employed for the second plot 322. The total CPU time for the conventional plot 320 was 5.04 minutes. The total CPU time for the plot 322 was 0.76 minutes. The total CPU time for the plot 324 was 0.09 minutes.

Similar results were obtained for device variability for the gate work function with gate charge (QGF) in Coulombs/micron (C/μm) versus gate voltage (VGF) in volts (V). Here, the total CPU time for the conventional plot was 4.67 minutes. The total CPU time for the plot in accordance with the present principles was 0.74 minutes. The total CPU time for the aggressive plot in accordance with the present principles was 0.09 minutes.

Similar results were obtained for device variability for $N_b$ (body/channel doping density) with gate charge (QGF) in Coulombs/micron (C/μm) versus gate voltage (VGF) in volts (V). Here, the total CPU time for the convention plot was 4.62 minutes. The total CPU time for the plot in accordance with the present principles was 0.72 minutes. The total CPU time for the aggressive plot in accordance with the present principles was 0.09 minutes.

Similar results were obtained for device variability for $t_{ox}$ (gate oxide thickness) with gate charge (QGF) in Coulombs/micron (C/μm) versus gate voltage (VGF) in volts (V). Here, the total CPU time for the conventional plot was 4.39 minutes. The total CPU time for the plot in accordance with the present principles was 0.68 minutes. The total CPU time for the aggressive plot in accordance with the present principles was 0.09 minutes.

For all example cases, the method in accordance with the present principles is faster by more than six times and for the aggressive case in accordance with the present principles is faster by about 50 times. For all example cases, the method in accordance with the present principles had less than 0.3% discrepancy from the full device conventional method. For the aggressive case, a less than about 10% discrepancy existed from the full device conventional method. For the 7 sigma-Vt range, the method in accordance with the present principles had less than 0.6% discrepancy.

Figure 9:
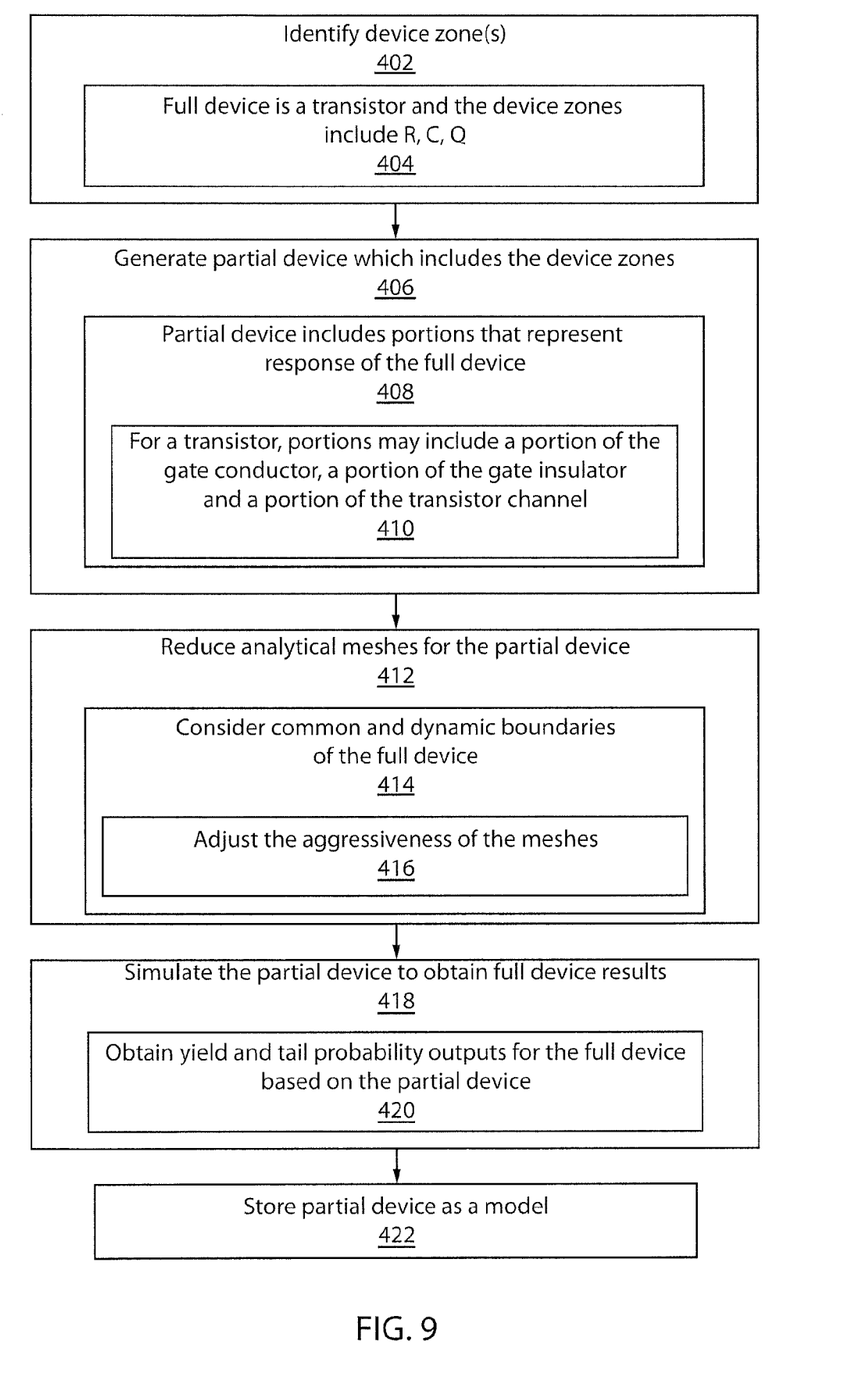
FIG. 9 is a block/flow diagram showing another method for analyzing circuits in accordance with one illustrative embodiment.

Referring to FIG. 9, another method for analyzing circuits is illustratively depicted. The method may be implemented on a technology computer aided design platform (e.g., FIG. 1). In block 402, one or more device zones are identified for a full device structure. The device zones provide areas of interest to be analyzed and may be at the sub-device level. In block 404, the full device structure may include a field effect transistor and the one or more device zones may include a gate resistance zone (R), a source and drain side capacitance zone (C) and a gate insulator zone (Q).

In block 406, a partial device is generated that represents the full device structure and includes the one or more device zones. In block 408, the partial device includes a portion or portions of the full device that are identified to respond as the full device structure would respond. In block 410, the partial device may be generated to include a portion of a gate conductor, a portion of a gate insulator and a portion of a transistor channel.

In block 412, analytical meshes for the partial device are reduced by employing physical characteristics of the device structure. In block 414, reducing the meshes may include considering common and dynamic boundaries between components of the full device. The common boundaries may include common device properties, such as geometry, potential, temperature, etc. The dynamic boundaries may include environmental properties and are accounted for on top of the common boundaries. In block 416, an aggressiveness of computation may be adjusted by adjusting the meshes to balance speed versus accuracy for the computation.

In block 418, the partial device is simulated to obtain device output information in the device zones that are representative of the full device structure. The device output is preferably in statistical form. In block 420, yield and tail probability outputs are obtained for the full device structure based upon the partial device. In block 422, the partial device may be stored as a model to be employed in the present design or in future or other designs.

Having described preferred embodiments of a system and method for FET-bounding for fast TCAD-based variation modeling (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for analyzing circuits, comprising:
   identifying one or more device zones in a full device structure, the device zones providing areas of interest to be analyzed;
   generating a partial device that represents characteristics of the full device structure, and representatively includes the one or more device zones,
   wherein the partial device includes part of the full device structure and less than the full device structure;
   reducing analytical meshes of the partial device stored in memory by employing physical characteristics of the full device structure,
   wherein the analytical meshes include a plurality of finite divisions;
   adjusting common boundaries between the one or more device zones to further reduce the analytical meshes of the partial device; and
   simulating the partial device, using a processor, to obtain device output information in the areas of interest that is representative of the full device structure.

2. The method as recited in claim 1, wherein the full device structure includes a field effect transistor and the step of identifying one or more device zones includes identifying a gate resistance zone, a source and drain side capacitance zone and a gate insulator zone.

3. The method as recited in claim 1, wherein generating a partial device includes representing a portion or portions of the full device as the partial device such that the partial device and the full device structure include a same behavior.

4. The method as recited in claim 1, wherein generating a partial device includes employing a portion of a gate conductor, a portion of a gate insulator and a portion of a transistor channel as the partial device.

5. The method as recited in claim 1, wherein reducing analytical meshes of the partial device includes reducing the analytical meshes by considering common and dynamic boundaries between components of the full device.

6. The method as recited in claim 5, wherein the common boundaries include common physical properties.

7. The method as recited in claim 5, wherein the dynamic boundaries include environmental properties and are accounted for on top of the common boundaries.

8. The method as recited in claim 1, further comprising obtaining yield and tail probability outputs for the full device structure based upon the partial device.

9. The method as recited in claim 1, wherein reducing analytical meshes includes adjusting an aggressiveness of computation by adjusting the meshes to balance speed versus accuracy for the computation, wherein increasing the aggressiveness includes reducing the meshes, increasing the speed, and reducing the accuracy.

10. The method as recited in claim 1, wherein the method is implemented on a technology computer aided design platform.

11. The method as recited in claim 5, wherein the dynamic boundaries initially include common boundary properties, and a dynamic component is added to a common boundary directly on the partial device.

12. The method as recited in claim 5, wherein the dynamic boundaries include environmental properties.

13. The method as recited in claim 5, wherein the common boundaries are application specific.

14. The method as recited in claim 5, wherein profiles, the meshes, and the common boundaries of the partial device are validated in one or more bounding regions.

* * * * *